Feb. 16, 1965         R. A. BECK ETAL         3,170,030
              ELECTRICAL BUS STRUCTURE
Filed March 15, 1963                    2 Sheets-Sheet 1

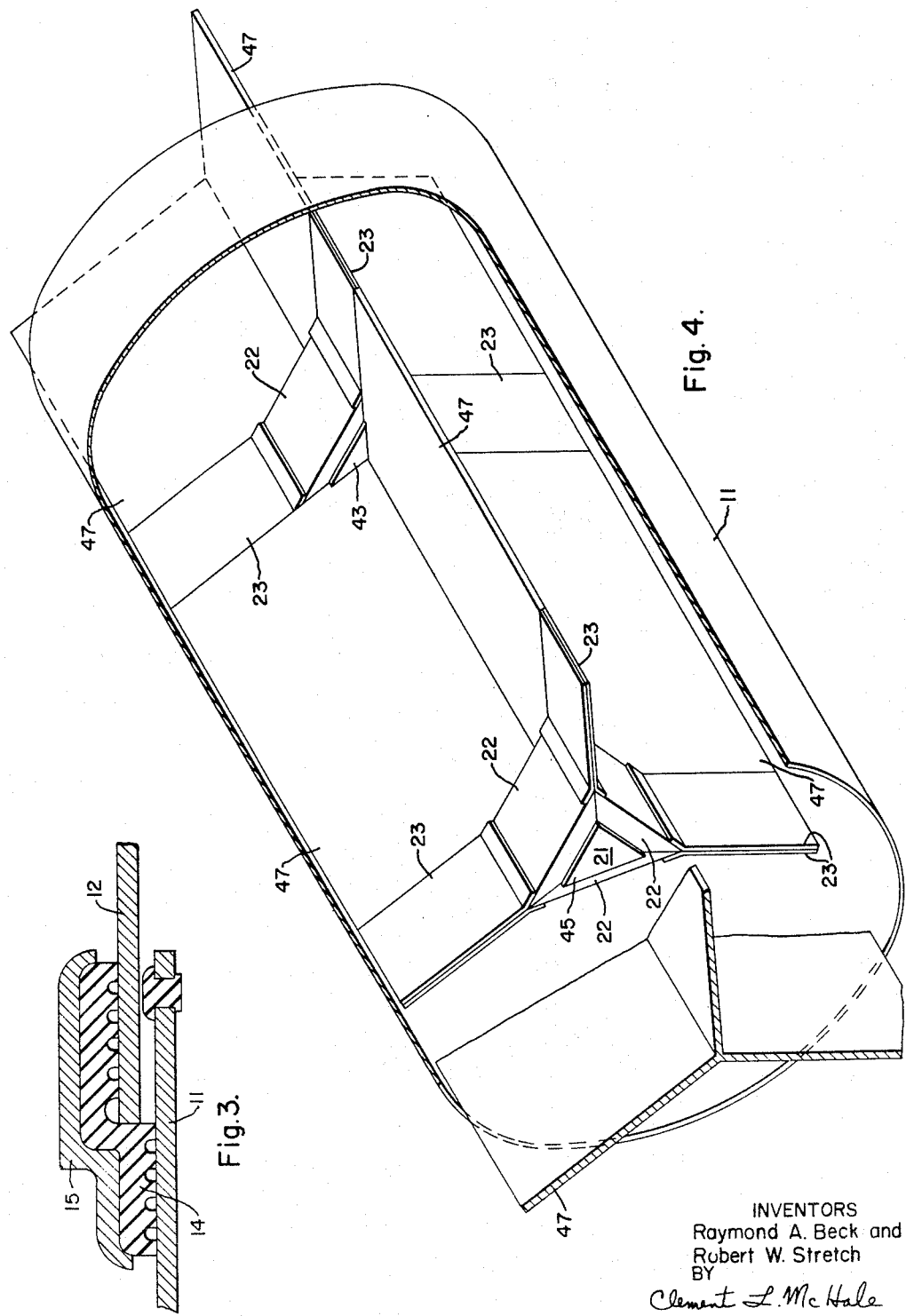

United States Patent Office 3,170,030
Patented Feb. 16, 1965

3,170,030
ELECTRICAL BUS STRUCTURE
Raymond A. Beck, Deer Park, and Robert W. Stretch, Norwood, Ohio, assignors to Westinghouse Electric Corporation, Pittsburgh, Pa., a corporation of Pennsylvania
Filed Mar. 15, 1963, Ser. No. 265,412
4 Claims. (Cl. 174—99)

This invention relates, generally, to electrical bus structures and, more particularly, to bus structures in which the electrical conductors are enclosed in metal housings.

In general, enclosed three-phase alternating current bus structures have been of three types, non-segregated phase, segregated phase and isolated phase. In a non-segregated phase bus, the three conductors are enclosed in a common housing with no barriers between phases. In a segregated phase bus, the three conductors are enclosed in a common housing with barriers between phases. In an isolated phase bus, each phase conductor is enclosed in a separate housing. The three types have been distinct from each other.

An object of this invention is to provide an enclosed three-phase electrical bus structure with the conductors so arranged in the housing that the structure may readily be built for either a non-segregated phase or a segregated phase bus.

Another object of the invention is to space three conductors equally and symmetrically inside a cylindrical housing.

A further object of the invention is to provide a mutual support for three conductors inside a cylindrical housing.

Still another object of the invention is to utilize supporting members for the conductors as separating barriers between phases in a segregated phase bus.

A still further object of the invention is to provide a weatherproof housing for the conductors of a three-phase bus structure.

Other objects of the invention will be explained fully hereinafter or will be apparent to those skilled in the art.

In accordance with one embodiment of the invention, the conductors of a three-phase distribution system are symmetrically disposed inside a cylindrical housing which is preferably formed from a metallic material, such as aluminum, which is electrically conducting for shielding purposes and non-magnetic to avoid excessive losses in the housing. The conductors are supported by radially disposed insulators spaced at 120° angles and mounted on a centrally disposed triangular-shaped supporting member comprising three trapezoidal sections. Each section has two radially extending legs, the outer ends of which are attached to the housing. Each leg is contiguous with a leg of an adjoining section of the triangular supporting member. Thus, the six legs are arranged in three pairs with each pair extending from an apex of the triangular supporting member. For a segregated phase bus, additional partition members may be provided which extend longitudinally between the supporting members throughout the length of the housing and which extend radially intermediate the triangular supporting members to meet at the center of said housing to provide partitions or barriers between the phases.

For a better understanding of the nature and objects of the invention, reference may be had to the following detailed description, taken in conjunction with the accompanying drawing, in which:

FIG. 3 is an enlarged detail view of a gasket assembly which may be utilized in the bus structure; and FIG. 4 is an isometric view, partly cut away, of a modified housing construction which may be employed with the bus structure of FIG. 1 to segregate the different phase conductors from one another.

Figure 2:
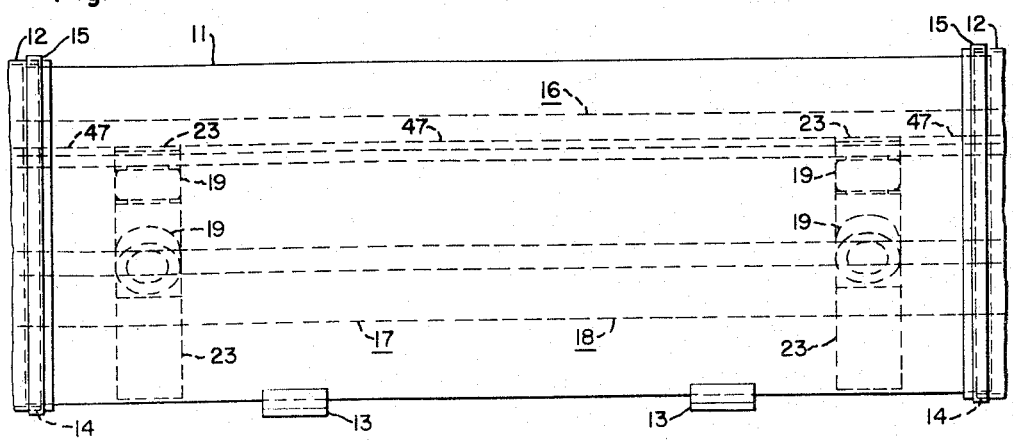
FIG. 2 is a reduced view, in side elevation, of the structure shown in FIG. 1.

Referring to the drawing, and particularly to FIG. 2, the portion of an electrical bus structure shown therein comprises a cylindrical fixed or supporting housing section 11 and movable or telescoping housing sections 12 disposed at opposite ends of the fixed section 11. The housing is generally of the type fully described in a copending application of H. B. Wortman and H. H. Rugg, Serial No. 752,325, filed July 31, 1958; now Patent Number 3,061,665. As explained in the foregoing copending application, each movable section 12 may be telescoped with a portion of an adjacent fixed section 11 in order to provide access to the joints between the bus bars which are disposed inside the housing and also to the supporting insulators which are inside the housing. It will be understood that additional fixed housing sections 11 and movable sections 12 may be provided as required. The structure may be supported by supporting feet 13 which are secured to the housing 11, as by welding, and may be attached to a supporting structure (not shown).

In order to make the housing weatherproof, a gasket 14 is provided at each joint between a fixed housing section 11 and a movable housing section 12. The gasket 14 is retained in position by a clamping band 15. The gasket 14 and the band 15 may be of the type described in the aforesaid copending application.

Figure 1:
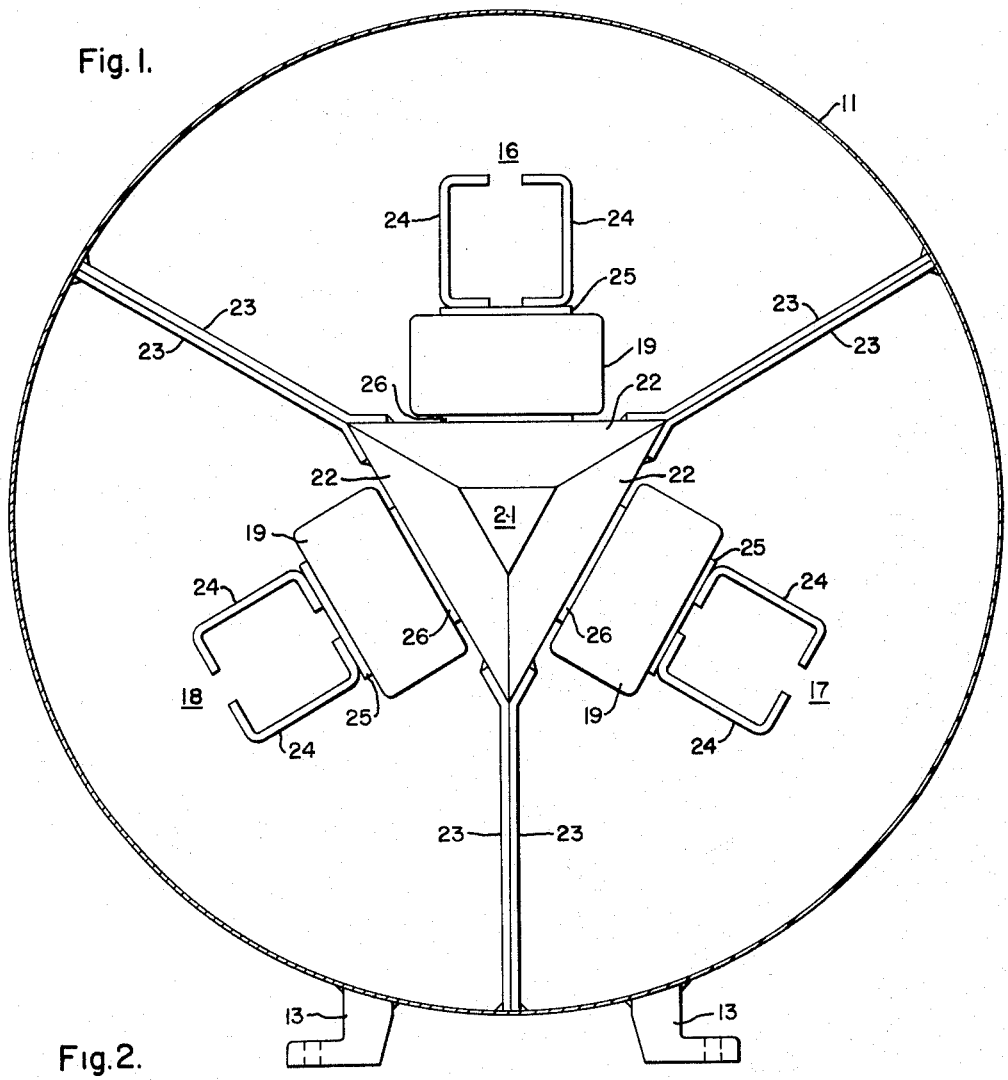
FIGURE 1 is a view, partly in section and partly in elevation of an electrical bus structure embodying the principal features of the invention.

As shown more clearly in FIG. 1, three phase conductors 16, 17 and 18 are symmetrically disposed inside the enclosing housing. The phase conductors are supported by three radially disposed insulators 19 which are located at 120° angles and are mounted on a centrally disposed triangular-shaped supporting member 21. The member 21 comprises three trapezoidal sections 22 which are assembled in the manner shown to provide the equilateral triangle 21. As shown, each section 22 may be made from a channel-shaped member having its sides cut at a 30° angle to provide the trapezoidal section.

Each section 22 has two legs 23 which extend radially to the inner surface of the housing 11 to support the triangular supporting member 21. The inner end of each leg 23 is secured to the base of the channel member 22, as by welding, and the outer end of each leg is secured to the housing 11, as by welding. Each leg 23 is contiguous with the leg of an adjoining trapezoidal section 22, thereby providing three pairs of legs which are disposed at the apices of the triangular supporting member 21. In this manner, the supporting member 21 is retained in its central position within the housing 11, thereby supporting the insulators 19 and the phase conductors 16, 17 and 18. The forces exerted upon the phase conductors during short-circuit conditions are withstood by the insulators 19, the trapezoidal sections 22, the legs 23 and the housing 11.

As shown, each phase conductor 16 comprises two oppositely disposed channel-shaped members 24. Each member 24 may be attached to an insert 25 which may be secured in the insulator 19, as by cementing. The channel 24 may be attached to the insert 25 in any suitable manner, as by screws or bolts (not shown). The insulator 19 may be attached to the base of the channel section 22 by another insert 26 which is secured in the end of the insulator 19 opposite the insert 25. The insert 26 may be attached to the channel 22 by screws or bolts (not shown).

The structure shown in FIGS. 1 and 2 provides a non-segregated phase bus. Referring now to FIG. 4, if it is desired to provide a segregated phase bus, the additional partition members 47 would be disposed to extend longitudinally between the triangular supporting members 21 and to extend radially from the inner surface of the housing 11 to meet at substantially the center of the housing. The partition members 47 each lie in substantially the same plane as one of the associated pairs of legs 23 and are displaced from one another about the center of the housing 11 by substantially 120°. The partition members 47 may be secured or joined to the housing 11 and to each other at the center of said housing by any suitable means, such as welding or bolts. In order to close off the central openings in the triangular supporting members 21, the sheet or plate members 45, which are substantially triangular in configuration, are disposed to cover said openings on the opposite sides of each supporting member 21 and may be secured thereto by suitable means, such as welding. Alternatively, three separate triangular sheet or plate members 43 may be disposed to cover each opening and secured to the associated partition members 47 as illustrated in FIG. 4. Thus, the interior of the housing 11 would be divided into three separate segregated compartments, each containing a phase conductor and its supporting members.

Referring to the segregated bus construction shown in FIG. 4, it is to be noted that the partition members 47 would extend into the areas enclosed by the movable housing sections 12, previously described, but would not be secured or fastened to the movable housing sections. At a point approximately at the center of each movable section 12, the partition members 47 approaching each other from the supporting housing sections 11 on the right and left would be joined by bolted splice plates. Thus, when the movable section 12 is telescoped over an associated fixed or supporting section, the conductor joints and the partition joints are exposed.

It is to be understood that the supporting members 21 and the partition members 47, as well as the plates 43 or 45, would preferably be formed from the same material as indicated previously for the housing 11 for shielding purposes or to simplify metal joining of the different supporting or partition members and the housing 11.

Since the three phase conductors are equally and symmetrically spaced from each other, the mutual impedance between any phase and the other phases is the same. Also, the forces exerted upon the supporting members during short-circuit conditions are equalized. The cylindrical housing with the gasket means provides a weatherproof structure suitable for outdoor use.

Since numerous changes may be made in the above-described construction and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. An electrical bus structure comprising a hollow cylindrical housing, three phase conductors symmetrically disposed inside the housing and extending longitudinally of the housing, radially disposed insulators spaced at 120° angles supporting the phase conductors, each insulator being mounted on one side of a triangular-shaped supporting member having equal sides, each insulator being disposed between the associated phase conductor and said supporting member forming the sole support for the associated phase conductor, and legs extending from the apices of the triangular member to the inner surface of the housing and being secured thereto and supporting the triangular member.

2. An electrical bus structure comprising a hollow cylindrical housing comprising a fixed section and a movable section telescoping with the fixed section, three phase conductors symmetrically disposed inside the housing and extending longitudinally of the housing, radially disposed insulators spaced at 120° angles in the fixed section for supporting the phase conductors, said insulators being mounted on the sides of a centrally disposed triangular-shaped supporting member, each insulator being disposed between the associated phase conductor and said supporting member forming the sole support for the associated phase conductor, legs extending from the apices of the triangular member to the inner surface of the fixed housing section and being secured thereto to support the triangular member, said legs having their inner ends attached to the supporting member and their outer ends attached to the fixed housing section, and partition members extending longitudinally from said legs and supporting member throughout the length of the housing and radially from the inner surface of said housing to substantially the center of said housing to provide partitions between the phase conductors, said partition members being secured only to said fixed sections and extending longitudinally into said movable section.

3. An electrical bus structure comprising a hollow cylindrical housing, three phase conductors symmetrically disposed inside the housing and extending longitudinally of the housing, a plurality of spaced sets of radially disposed insulators spaced at 120° angles for supporting the phase conductors, said insulators of each set being mounted on the sides of a centrally disposed generally triangular-shaped supporting member, each insulator being disposed between the associated phase conductor and said supporting member forming the sole support for the associated phase conductor, legs extending from the apices of each triangular member to the housing and being secured thereto to support the triangular member and partition members extending longitudinally of said housing between the legs and supporting members which support said spaced sets of insulators.

4. An electrical bus structure comprising a hollow cylindrical housing, three phase conductors symmetrically disposed inside the housing and extending longitudinally of the housing, radially disposed insulators spaced at 120° angles supporting the phase conductors, said insulators being mounted on the sides of a centrally disposed generally triangular-shaped supporting member comprising three trapezoidal sections, each insulator being disposed between the associated phase conductor and said supporting member forming the sole support for the associated phase conductor, each section having two legs extending to the inner surface of the housing and being secured thereto to support the triangular member, and each leg being contiguous with a leg of an adjoining section thereby forming three pairs of legs with each pair being located at an apex of the triangular supporting member, and three partition members each lying in substantially the same plane as one of the associated pairs of legs, the partition members extending longitudinally from said legs and supporting member throughout said housing and radially from the inner surface of said housing to meet at substantially the center of said housing to separate said housing into three segregated compartments.

References Cited in the file of this patent

UNITED STATES PATENTS

| | | |
|---|---|---|
| 1,563,859 | Jacobs | Dec. 1, 1925 |
| 2,964,586 | Sillman | Dec. 13, 1960 |
| 2,973,405 | Zuch et al. | Feb. 28, 1961 |
| 2,977,404 | Swerdlow | Mar. 28, 1961 |
| 3,061,665 | Rugg et al. | Oct. 30, 1962 |

FOREIGN PATENTS

| | | |
|---|---|---|
| 881,083 | Germany | June 25, 1953 |